United States Patent Office 3,423,280
Patented Jan. 21, 1969

3,423,280
COPOLYESTER RESINS
Maria V. Wiener, Akron, Ohio, assignor to The Goodyear Tire & Rubber Company, Akron, Ohio, a corporation of Ohio
No Drawing. Filed Sept. 18, 1964, Ser. No. 397,653
U.S. Cl. 161—194  7 Claims
Int. Cl. C08g 17/04; B32b 27/36; B32b 27/10

ABSTRACT OF THE DISCLOSURE

The invention relates to polyesters of terephthalic acid and isophthalic acid with 2-methyl-3-phenyl-1,3-propanediol and a glycol of the formula $HOCH_2(CX_2)_nCH_2OH$ which contain 3 to 30 mol percent of the 2-methyl-2-phenyl-1,3-propanediol. The polyesters have high softening points and are useful in applications where high softening resins are required.

---

This invention relates to new and useful polymeric polyesters and to shaped articles prepared therefrom.

The prior art describes homopolyesters derived from ethylene glycol and other polymethylene glycols and terephthalic acid and copolyesters such as copolyesters derived from mixtures of terephthalic acid and isophthalic acid. The softening point of polyethylene terephthalate represents a maximum softening point for such polyesters. While the softening point of these resins makes them satisfactory for many purposes there are some applications in which higher softening points are needed.

According to the present invention polyesters of improved softening point are obtained by reacting one or more dicarboxylic acids or the ester-forming derivatives and a glycol composition selected from (a) 2-methyl-2-phenyl-1,3-propanediol and (b) mixtures of 2-methyl-2-phenyl-1,3-propanediol with a polymethylene glycol having the formula $HOCH_2(CX_2)_nCH_2OH$ in which $n$ is from zero to ten and X is selected from hydrogen and alkyl groups containing from one to four carbon atoms, 2-methyl-2-phenyl-1,3-propanediol comprising at least 3 mol percent of said mixture. Such polyesters have higher softening points than polyesters composed of the same acid units and polymethylene glycol units without the 2-methyl-2-phenyl-1,3-propanediol units.

A preferred method for preparing these copolyesters is to subject one or more ester-forming derivatives of at least one acid selected from the group consisting of terephthalic acid and isophthalic acid to reaction with an excess of a glycol component selected from (a) 2-methyl-2-phenyl-1,3-propanediol and (b) mixtures of 2-methyl-2-phenyl-1,3-propanediol and a polymethylene glycol having the formula $HOCH_2(CX_2)_nCH_2OH$ in which $n$ is from 0 to 10 and X is hydrogen or an alkyl group containing from one to four carbon atoms to form the glycol esters and then polymerize the glycol esters by condensation to form high molecular weight polyester resin.

Representative examples of such polymethylene glycols are ethylene glycol, the propylene glycols, the butylene glycols, pentamethylene glycol, hexamethylene glycol, heptamethylene glycol, octamethylene glycol, nonamethylene glycol, decamethylene glycol and branched chain glycols such as 2-methyl-1,3-propylene glycol, 2,2-dimethyl-1,3-propylene glycol, 2-ethyl-2-methyl - 1,3-propylene glycol, 2-butyl-1,3-propylene glycol, 2,2-butyl-1,3-propylene glycol and other branched chain glycols.

Fibers made from copolyesters of the invention have better dye receptivity than fibers made from polymeric ethylene terephthalate or fibers made from polymeric ethylene terephthalate-ethylene isophthalate copolyesters. Also, the crystallization rate and the degree of crystallization obtainable in the polymeric ethylene terephthalate/2-methyl - 2-phenyl - 1,3-propylene terephthalate copolyesters in which the molar ratio of ethylene terephthalate units to 2-methyl - 2-phenyl - 1,3-propylene terephthalate units is in the range of from 97/3 to 70/30 are less than the crystallization rate and the degree of crystallization obtainable under comparable conditions in copolyesters of ethylene terephthalate/ethylene isophthalate in which the terephthalate to isophthalate ratio is in the same range of 97/3 to 70/30.

The polyesters of the invention form highly useful fibers, high softening films, coatings and molded products. They are also useful as adhesives for adhering various materials together.

The invention provides a series of polyester resins of varying properties. The products containing up to 70 mol percent of polymethylene glycol units and from 30 to 100 mol percent of 2-methyl-2-phenyl - 1,3-propanediol units are substantially non-crystalline products which form valuable coatings, films and adhesives that have high softening points. The terephthalate copolyesters containing unsubstituted polymethylene glycols and less than 30 mol percent of 2-methyl - 2-phenyl - 1,3-propanediol units are generally crystallizable products which form valuable oriented fibers and films and can also be used as adhesives and coatings. The preferred crystallizable materials of the invention contain from 97 to 85 mol percent of ethylene terephthalate and from 3 to 15 mol percent of 2-methyl-2-phenyl-1,3-propanediol terephthalate. These resins are particularly useful for the preparation of high strength fibers and films having good dye receptivity.

The following examples illustrate the invention.

Example 1

9.7 grams dimethyl terephthalate, 19.4 grams 2-methyl-2-phenyl-1,3-propanediol, 0.003 gram zinc diacetate and 0.003 gram antimony trioxide were placed into a glass polymerization vessel in the shape of a tube 35 centimeters long, having an inside diameter of 38 millimeters and equipped with a stirrer and having a side arm connected to a distillation apparatus. The lower part of the reactor was heated by a vapor bath having a temperature of 265° C. and a slow stream of nitrogen gas was passed over the molten reactants to exclude air. Methanol was distilled from the mixture until the alcoholysis reaction was essentially complete. Then the whole reactor was heated by the vapor bath having a temperature of 265° C. and the pressure in the reactor was slowly reduced over a period of 45 minutes to 0.05 millimeter of mercury pressure while excess diol was distilled out. The polycondensation was subsequently carried out for two hours at 280° C. bath temperature and 0.05 millimeter of mercury pressure. A transparent polymer having an intrinsic viscosity of 0.4, a softening point of 100.5° C. and a density of 1.24 grams per cubic centimeter was obtained.

Example 2

19.4 grams dimethyl terephthalate, 13 grams ethylene glycol, 0.006 gram zinc diacetate and 0.001 gram polymeric ethylene glycol titanate were charged into a glass polymerization reactor of the type used in Example 1. The mixture was heated at a bath temperature of from 217° C. to 240° C. and a slow nitrogen stream was passed over the reactants to exclude air. Methanol removal was completed in 80 minutes. Then 5.0 grams 2-methyl-2-phenyl-1,3 propanediol were added to the reactor. Heating was then resumed at 240° C. bath temperature while the pressure in the reactor was slowly reduced over a period of 45 minutes to one millimeter of mercury pressure. The excess ethylene glycol distilled out. The polycondensation was carried out for one hour at 280° C. bath temperature at one millimeter of mercury pressure. A transparent, tough high polymer, having an intrinsic viscosity of 0.657, a softening point of 85° C. and a density of 1.291 grams per cubic centimeter was formed.

Example 3

A glass reaction vessel of the type used in Example 1 was charged with 19.4 grams of dimethyl terephthalate, 1.7 grams of 2-methyl-2-phenyl-1,3-propanediol, 12.4 grams of ethylene glycol, 0.006 gram of zinc acetate and 0.006 gram of antimony trioxide. The mixture was stirred and reacted at a bath temperature of from 217° C. to 245° C. until the ester exchange was complete, as indicated by the collection of the theoretical amount of methanol. Then the mixture was stirred and heated at a bath temperature of 240° C. while the pressure in the reactor was slowly reduced over a period of 45 minutes to one millimeter of mercury pressure as part of the ethylene glycol distilled out of the mixture. The polycondensation reaction was carried out by heating for one and one-half hours at 280° C. at one millimeter of mercury presusre. The product was a crystallizable high polymer having an intrinsic viscosity of 0.612 and a melting point of 233° C. The quenched polymer was transparent, had a softening point of 77° C. and a density of 1.316 grams per cubic centimeter.

Example 4

0.05 gram Latryl Blue RLN was mixed with 50 grams of distilled water in a small glass vessel. 0.2 gram of fibers drawn from a 90/10 poly(ethylene terephthalate/ethylene isophthalate) copolyester and 0.2 gram of fibers drawn from a 90/10 poly(ethylene terephthalate/2-methyl-2-phenyl-1,3-propylene terephthalate) copolyester were placed in the dye bath. The vessel containing the dye bath and the fibers was heated with stirring for two hours in a boiling water bath. Then the fibers were removed from the bath, washed with water and dried. The colors of the fibers were compared. The color of the poly(ethylene terephthalate/ethylene isophthalate) fibers was a light sky-blue, whereas the color of poly(ethylene terephthalate/2-methyl-2-phenyl-1,3-propylene telephthalate) fibers was a dark blue similar to navy-blue.

Films can be made from the polyesters of the invention by solution casting or by melt extrusion. Orientation or stretching is necessary to develop optimum properties for use in packaging applications and for other uses where films and foils having high tensile strength are needed. The films are clear and are characterized by high tensile strength, low elongation, good age life and excellent dielectric strength. For the films to have good physical properties the polyesters should have a high molecular weight, i.e., an intrinsic viscosity of at least 0.4 and preferably above 0.0 measured at 30.0° C. in a 60/40 phenol-tetrachloroethane mixed solvent.

The resins of the invention form useful coatings and laminates with various substrates such as wood, paper, plastics, leather, glass, iron, steel, copper and aluminum and form effective insulating layers. If desired, the resins can be compounded with pigments, fillers, stabilizers, plasticizers and other compounding agents.

While certain representative embodiments and details have been shown for the purpose of illustrating the invention it will be apparent to those skilled in this art that various changes and modifications may be made without departing from the spirit or scope of the invention.

What I claim is:

1. As a new composition a linear polyester resin consisting of units of at least one acid selected from the group consisting of terephthalic acid and isophthalic acid and from 3 to 30 mol percent based on the total mols of acid in the resin of 2-methyl-2-phenyl-1,3-propanediol units, the balance of the glycol units in the polyester resin being units of a glycol selected from the group represented by the formula $HOCH_2-(CX_2)_n-CH_2OH$ where $n$ is zero to ten inclusive and X is selected from the group consisting of hydrogen and low alkyl radicals containing from one to four carbon atoms.

2. A laminate of a layer consisting essentially of the polyester of claim 1 adhered to a base selected from the group consisting of wood, paper, plastics, leather, glass, iron, steel, copper and aluminum.

3. The polyester of claim 1 in the form of an oriented fiber.

4. The polyester of claim 1 in the form of an oriented film.

5. The polyester of claim 1 in which the glycol of the formula is ethylene glycol.

6. The polyester of claim 5 in the form of an oriented fiber.

7. The polyester of claim 5 in the form of an oriented film.

References Cited

UNITED STATES PATENTS

| 2,641,592 | 6/1953 | Hofrichter | 260—75 |
| 2,465,319 | 3/1949 | Whinfield et al. | 260—75 |
| 3,207,814 | 9/1965 | Goldburg | 260—75 |

WILLIAM H. SHORT, *Primary Examiner.*

R. T. LYNN, *Assistant Examiner.*

U.S. Cl. X.R.

161—214, 231, 232; 260—75